United States Patent [19]

MacGugan

[11] Patent Number: 4,896,268
[45] Date of Patent: Jan. 23, 1990

[54] APPARATUS AND METHOD FOR PROCESSING THE OUTPUT SIGNALS OF A CORIOLIS RATE SENSOR

[75] Inventor: Douglas C. MacGugan, Issaquah, Wash.

[73] Assignee: Sundstrand Data Control, Inc., Redmond, Wash.

[21] Appl. No.: 125,114

[22] Filed: Nov. 25, 1987

[51] Int. Cl.$^4$ .............................................. G01P 9/04
[52] U.S. Cl. .................................... 364/453; 364/566;
       73/505; 73/510; 73/517 R; 73/517 AV
[58] Field of Search ............ 364/453, 566; 73/517 R,
       73/505, 510, 512, 511, 517 AV, 517 A

[56] References Cited

U.S. PATENT DOCUMENTS

| | | | |
|---|---|---|---|
| 4,188,816 | 2/1980 | Mairson | 73/517 R |
| 4,281,384 | 7/1981 | Groom et al. | 364/566 |
| 4,303,978 | 12/1981 | Shaw et al. | 364/453 |
| 4,321,678 | 3/1982 | Krogmann | 364/453 |
| 4,445,376 | 5/1984 | Merhav | 73/517 R |
| 4,510,802 | 4/1985 | Peters | 73/517 R |
| 4,520,669 | 6/1985 | Rider | 73/517 R |
| 4,522,062 | 6/1985 | Peters | 73/517 R |
| 4,590,801 | 5/1986 | Merhav | 73/517 R |
| 4,675,820 | 6/1987 | Smith et al. | 364/453 |
| 4,675,822 | 6/1987 | Marino et al. | 364/453 |

Primary Examiner—Parshotam S. Lall
Assistant Examiner—V. Trans
Attorney, Agent, or Firm—Christensen, O'Connor, Johnson & Kindness

[57] ABSTRACT

Apparatus and method for increasing the resolution of angular rate of rotation and linear acceleration of a body with respect to three orthogonal axes. Three pairs of accelerometers (10, 12; 14, 16; and 18, 20) are arranged with their sensitive axes antiparallel to each other, and each pair is vibrated back and forth along one of the orthogonal axes. The signals output from the accelerometers are processed to determine $S_{rate}$ and $S_{vel}$ for each of the rate axes as a function of the sum and differences of the signals produced by each of the accelerometers. The value of $S_{vel}$ for each axis is used by a microprocessor (82) to produce a signal equal to an incremental change in velocity for each axis. The incremental change in velocity is then used in conjunction with errors estimated from previous fractional portions of the dither period for each pair of accelerometers to calculate the rate of rotation of the body about each of the axes as a function fo the values for $S_{rate}$. As a further aspect of the invention, the incremental change in velocity and incremental changes in angular position may be determined as a running average of previous fractional portions of the dither frequency.

25 Claims, 7 Drawing Sheets

APPARATUS AND METHOD FOR PROCESSING THE OUTPUT SIGNALS OF A CORIOLIS RATE SENSOR

TECHNICAL FIELD

The present invention generally pertains to an apparatus and method for processing the output signals from a combined linear acceleration and Coriolis rate sensor and, more specifically, to an apparatus and method for processing the signals produced by a plurality of dithered accelerometers comprising such a sensor.

BACKGROUND OF THE INVENTION

An expedient method of measuring the angular rate of rotation about a given coordinate axis involves dithering an accelerometer so that it moves back and forth along an axis normal to the accelerometer's sensitive axis, and normal to the axis about which rotation is to be measured. For example, if the accelerometer is mounted on a body with its sensitive axis aligned with the Z axis of a set of X, Y, and Z orthogonal coordinate reference axes, the accelerometer will sense a Coriolis rate acceleration if the body rotates about the X axis while the accelerometer is driven to vibrate or dither back and forth along the Y axis, with a periodic motion. The output of the accelerometer includes a component representing acceleration of the body along the Z axis and a periodic component that represents rotation of the body about the X axis. The accelerometer output can be processed, along with the outputs of accelerometers that have their sensitive axes aligned with the X and Y axes and that are moved along the Z and X axes, respectively, to yield linear acceleration and angular rate about all three axes, X, Y and Z. Such signal processing is described in U.S. Pat. Nos. 4,445,376, and 4,590,801.

In U.S. Pat. No. 4,510,802, a rotational rate sensor is disclosed that implements the above rate sensing technique. As described in this patent, two accelerometers are mounted in a parallelogram structure with their sensitive axes parallel or antiparallel. The two accelerometers are vibrated back and forth in a direction substantially normal to their sensitive axes by an electromagnetic coil that is energized with a periodically varying current. The varying magnetic attractive force of the coil causes the parallelogram structure to vibrate or dither at a fixed frequency, typically around 100 Hz. A signal processor connected to the pair of accelerometers combines their output signals, deriving both a rate signal and a linear acceleration signal. Three such pairs of accelerometers can provide rate and linear acceleration for each of the orthogonal X, Y and Z axes.

Although analog accelerometers may be used in the above-described Coriolis rate sensor, it is preferable to use a device, such as a vibrating beam accelerometer, which produces an output signal having a frequency that varies with the sensed acceleration to facilitate digital processing of the output signal. In a vibrating beam accelerometer, a proof mass is supported by a flexure hinge and a vibrating beam force sensing element. A drive circuit causes the force sensing element to vibrate at its resonant frequency, and that frequency varies with the force (or acceleration) acting on the force sensing element. As the force changes due to acceleration, the resonant frequency is modulated higher or lower.

A synchronous FM digital detector is disclosed in U.S. patent application, Ser. No. 789,657, for demodulating the output signals from a pair of vibrating beam accelerometers comprising a rate sensor. The detector derives the rate and linear acceleration data from the modulated resonant frequencies of the accelerometers, and includes processing means for determining for each output signal, the difference between the phase change of the output signal during a first and a second time period, defined by a reference signal. The periodic motion of the pair of accelerometers is controlled by a movement signal, sin $\omega t$. The first and second time periods together span one or more complete periods of the movement signal, during which, the Coriolis components of acceleration have opposite polarity. The processing means are operative to determine from the phase values, the angular rate of rotation of the body to which the pair of accelerometers are fixed.

Several simplifying assumptions are made in calculating the angular rate of rotation according to the above method. For example, it is assumed that both the linear acceleration and angular rate of rotation are constant over the complete period of the movement signal, i.e., over one complete dither cycle. Third and higher order cross-coupling terms comprising error components of the accelerometer output signals are ignored. The assumptions used in this prior art synchronous demodulator may introduce substantial and unacceptable "random walk" errors if applied to a body subject to a severe dynamic environment, i.e., rapid changes of velocity, direction and angular rotation. Since the prior art method uses a full wave demodulation technique, it severely restricts the rate at which angular rate and linear acceleration data may be developed for a moving body. This restriction on the data rate occurs because the dither frequency limits the time resolution of incremental changes in velocity and angular position. For this reason, it would obviously be desirable to use a higher frequency movement signal to vibrate the accelerometers back and forth at a faster rate; however, it is impractical to dither the mass of a parallelogram structure at a frequency much higher than about 100 Hz. For a fast-moving, dynamically energetic body, such as a missile, the 0.01 second data resolution period provided by the prior art method is unacceptably long.

In consideration of these problems, it is an object of the present invention to substantially increase the rate at which linear acceleration and angular rate of rotation data are determined. A further object of this invention is to correct the data thus produced for errors previously ignored in the prior art method. These and other objects and advantages of the invention will be apparent from the attached drawings and the description of the preferred embodiments that follows.

SUMMARY OF THE INVENTION

An apparatus for determining an angular rate of rotation and linear acceleration of a body about a plurality of orthogonal rate axes includes a plurality of pairs of accelerometers. Each pair of accelerometers is associated with measuring an angular rate of rotation about a specific rate axis. The sensitive axes of the two accelerometers comprising each pair are aligned in parallel with each other and perpendicular to the rate axis with which the pair is associated. Each accelerometer produces an output signal having a frequency corresponding to an acceleration sensed by said accelerometer along its sensitive axis.

Driver means are provided for periodically moving each pair of accelerometers, as a function of a period movement signal, in a direction generally orthogonal both to the sensitive axes of the pair of accelerometers and to the rate axis with which the pair of accelerometers is associated. The output signal from each accelerometer of the pair includes a periodic Coriolis acceleration component that is proportional to the angular rate of rotation of the body about the rate axis with which the pair of accelerometers is associated.

Signal processing means are connected to receive the output signals from each accelerometer and the periodic movement signal, and are operative to determine an incremental change in velocity and an incremental change in angular position of the body for each of the rate axes during a fractional portion of a complete period of the periodic movement signal as a function of the sum and difference of the output signals of each pair of accelerometers. For each rate axis, the incremental changes in velocity and angular position include cross-axis components from each of the other rate axes. The signal processing means are further operative to determine these cross-axis components and subtract their contribution, producing corrected incremental changes in velocity and angular position for each rate axis.

Finally, the processing means determine the linear acceleration and angular rate of rotation for each rate axis as a function of the corrected incremental changes in velocity and angular position and of the duration of the fractional portion of the periodic movement signal.

The fractional portion of the movement signal preferably comprises one-fourth of the complete period of the periodic movement signal. Thus, linear acceleration and angular rate are determined at about a 400 Hz rate for a 100 Hz movement signal. With respect to an asynchronous rate sensor, the movement signal is a different frequency for each pair of accelerometers.

The cross-axis error components and the cross-coupling error components may be estimated for each rate axis as a function of the incremental changes in velocity and angular position for one or more of the rate axes determined during a preceding fractional portion of the movement signal. Furthermore, the signal processing means may also determine a running average of the incremental changes in velocity and angular position for each rate axis, for successive fractional portions of the movement signal.

In one aspect, the present invention may comprise apparatus for processing the signals output from a rate sensor, either with respect to a single rate axis or to a plurality of rate axes. The invention is further directed to a method for determining angular rate of rotation and linear acceleration for a plurality of orthogonal rate axes, generally by carrying out the steps described above.

DISCLOSURE OF THE PREFERRED EMBODIMENTS

Figure 1:
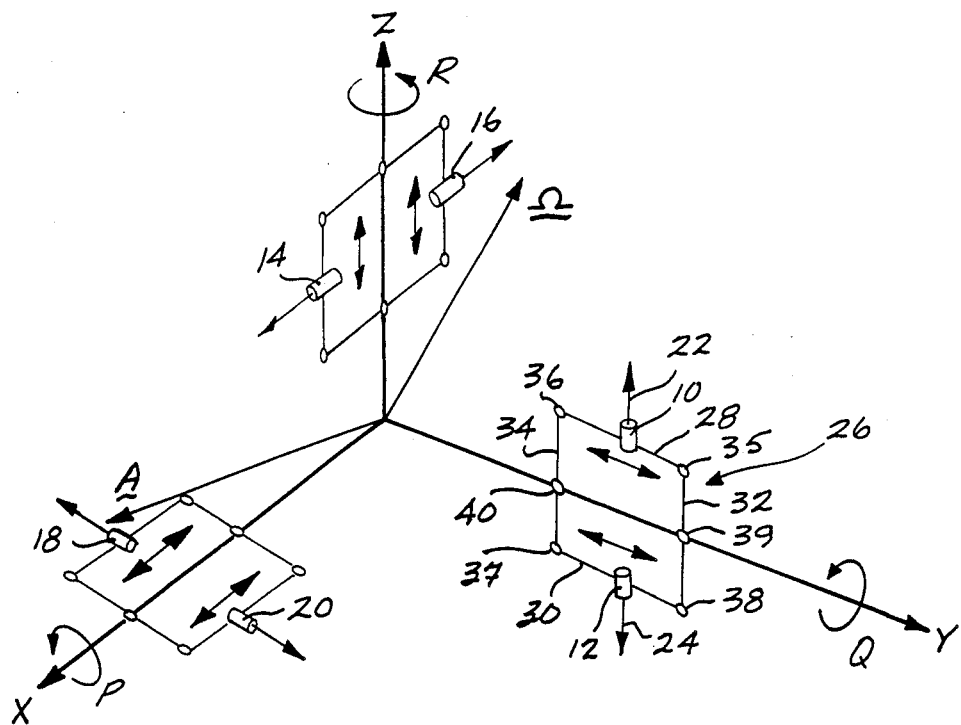
FIG. 1 is a schematic representation of a system for measuring the angular rate of rotation of a body and its linear acceleration in terms of three orthogonal axes.

A system for schematically measuring components of the angular rate of rotation and linear acceleration to which a body is subjected is illustrated, by way of example, in FIG. 1. Coordinate axes X, Y and Z are arbitrarily fixed in the body, and components of linear acceleration and angular rotation rate are measured along each of the axes. The angular rate of rotation of the body is defined by a vector $\Omega$, and the linear acceleration or specific force acting on the body is defined by a vector A. In general, both $\Omega$ and A may vary with time, and may be expressed as:

$$\Omega = P + Q + R \tag{1}$$

$$A = F_x + F_y + F_z \tag{2}$$

where P, Q and R are vector components of the angular rate of rotation around the X, Y and Z axes, respectively, and $F_x$, $F_y$, and $F_z$ are equal to the components of the specific force directed along the X, Y and Z axes, respectively.

The system shown in FIG. 1 includes three pairs of vibrating beam accelerometers, 10 and 12, 14 and 16, and 18 and 20. Accelerometers 10 and 12 dither back and forth along the Y axis, and are associated with measuring angular rate P around the X axis; accelerometers 14 and 16 vibrate back and forth along the Z axis and are associated with measurements of angular rate Q around the Y axis; and, accelerometers 18 and 20 vibrate back and forth along the X axis and are associated with measuring angular rate R around the Z axis.

Each pair of accelerometers is mounted in a "back-to-back" configuration, with its sensitive axes pointing in opposite directions or antiparallel. For example, accelerometer 10 has its sensitive axis directed along the positive Z axis, and accelerometer 12 has its sensitive axis 24 directed along the negative Z axis. In similar fashion, accelerometers 14 and 16 have their sensitive axes aligned with the X axis, and accelerometers 18 and 20 have their sensitive axes aligned with the Y axis.

Accelerometers 10 and 12 are supported in a parallelogram mounting system 26, which includes support members 28 and 30 that are parallel to the Y axis, and which are connected to a pair of linkage members 32 and 34 through pivots 35 through 38. Linkage members 32 and 34 are, in turn, mounted on a suitable support structure at central pivots 39 and 40. Support members 28 and 30 are connected to a suitable drive mechanism that periodically (e.g., sinusoidally) vibrates linkage members 32 and 34 back and forth about central pivots 39 and 40, thereby dithering the support members and accelerometers along the Y axis. The vibratory motion of accelerometer 10 is 180° out-of-phase with the vibratory motion of accelerometer 12, e.g., when accelerometer 10 is moving in the positive Y direction, accelerometer 12 is moving at the same speed in the negative Y direction. A suitable apparatus for implementing the parallelogram structure shown in FIG. 1 is described in U.S. Pat. No. 4,510,802. Pairs of accelerometers 14 and 16, and 18 and 20 are mounted in similar parallelogram structures with their sensitive axes back-to-back, and are driven to vibrate back and forth sinusoidally, by a similar suitable drive mechanism.

It will be understood that the present invention is not limited to the back-to-back arrangement shown in FIG. 1, but instead is applicable to all arrangements in which one or more accelerometers are vibrated along an axis normal to the sensitive axis or rotated in a plane, at an angle relative to the sensitive axis. Such arrangements are described in the above-referenced U.S. Pat. No. 4,445,376, and in U.S. Pat. No. 4,509,801.

The periodic vibration of accelerometers 10 and 12 along the Y axis interacts with the rotation rate of the body about the X axis to produce Coriolis forces acting along the Z direction. The output signal from each accelerometer 10 and 12 therefore includes a component resulting from linear acceleration of the body along the Z axis, and a second component, P, proportional to rotational rate about the X axis. Likewise, the pair of accelerometers 14 and 16 has an output signal with a component equal to linear acceleration directed along the X axis, and a rotational rate component, Q, around the Y axis corresponding to Coriolis acceleration. Similarly, the pair of accelerometers 18 and 20 produces an output signal having a linear component directed along the Y axis, and an angular rate component, R, about the Z axis, which is a function of Coriolis acceleration. The method used to separate the linear acceleration signal from the Coriolis or rate signal is described in detail below.

Figure 2:
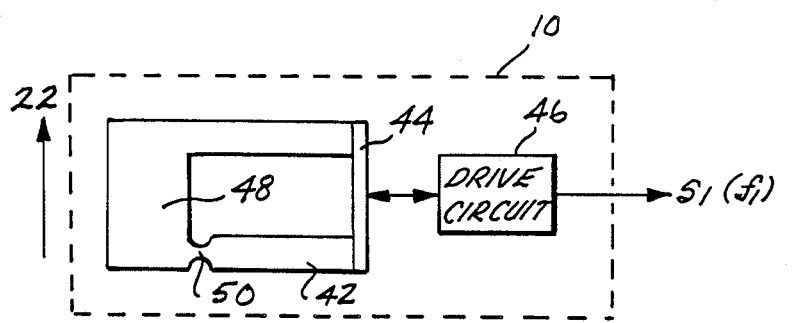
FIG. 2 is a schematic view of two vibrating beam accelerometers having their sensitive axes aligned antiparallel to one another.
Figure 2:
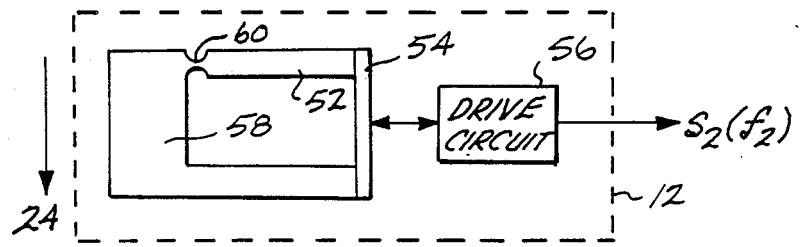

Referring now to FIG. 2, accelerometer 10 may comprise a conventional vibrating beam accelerometer that includes a proof mass 42, force sensing element 44, drive circuit 46 and support 48. The force sensing element preferably comprises a quartz crystal having a double-ended tuning fork construction, as illustrated in U.S. Pat. No. 4,215,570. Drive circuit 46 causes the force sensing element to vibrate at a particular resonant frequency $f_1$, and the output of drive circuit 46 is a signal $S_1$, which is a function of that frequency. Proof mass 42 is mounted to support 48 by flexure hinge 50, the flexure hinge permitting motion of the proof mass about an axis that passes through the flexure hinge, and which is perpendicular to the plane of the drawing in FIG. 2. Force sensing element 44 is aligned parallel to the Z axis, and has one end attached to support 48, and a second end attached to proof mass 42. The proof mass is thereby suspended at one end by the flexure hinge and at its other end by the force sensing element.

Accelerometer 12 is essentially a mirror image of accelerometer 10, and includes proof mass 52, force sensing element 54, drive circuit 56, support 58, and flexure hinge 60. Drive circuit 56 causes force sensing element 54 to vibrate at a particular resonant frequency $f_2$, and produces an output signal $S_2$, which is a function of that frequency. An acceleration along the Z axis causes each proof mass to exert a tension or compression force on its respective force sensing element that causes the resonant frequency of the force sensing element to increase or decrease. Each force sensing element therefore operates as a force-to-frequency converter that frequency modulates an acceleration signal onto a carrier signal, the carrier signal being the zero acceleration resonant frequency, $f_1$ or $f_2$, of the force sensing element. In the arrangement shown in FIG. 2, the force sensing axis of each pair of accelerometers is antiparallel, i.e., directed in opposite directions from one another, and a given acceleration along the Z axis will result in a compression force on one force sensing element and a tension force on the other force sensing element. The frequencies $f_1$ and $f_2$ will therefore change in opposite directions in response to a given linear acceleration along the Z axis. The other two pairs of accelerometers 14 and 16, and 18 and 20 are each configured similarly to accelerometers 10 and 12, as shown in FIG. 2.

Figure 3:
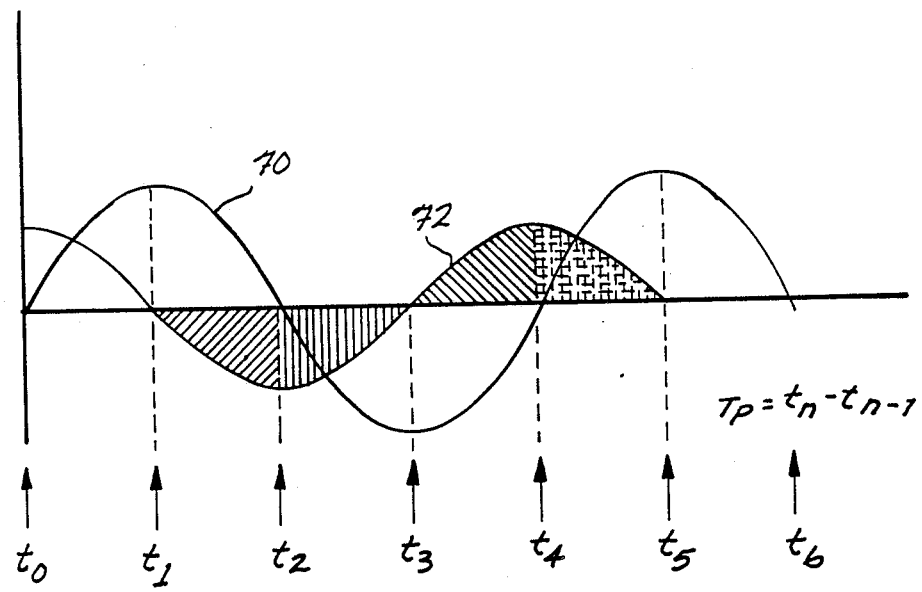
FIG. 3 is a graph illustrating the quarter cycle periods of the periodic movement signal applied to dither a pair of accelerometers.

Turning now to FIG. 3, a periodic dither signal 70 is graphically displayed in terms of its quarter cycle periods at times $t_0$ through $t_6$, and its phase is compared to a Coriolis signal 72 produced by a rate sensor, such as the pair of accelerometers 10 and 12. In the prior art method for processing the output signal from rate sensors disclosed in the above-referenced U.S. patent application, Ser. No. 789,657, the output signal is integrated over two ½ cycle intervals, $t_1$ through $t_3$ and $t_3$ through $t_5$, as follows:

$$\text{signal} = \int_{t_1}^{t_3} (K_1 a + K_1 K_2 a^2) dt - \int_{t_3}^{t_5} (K_1 a + K_1 K_2 a^2) dt \tag{3}$$

where the complete dither period corresponds to four cross-hatched quarter cycles, e.g., from times $t_1$ through $t_5$. The values $K_1$ and $K_2$ are gain constants associated with the accelerometer. It will be apparent that the Equation 3 determines the difference between the time integrals of a second order equation in acceleration, for a first half cycle and a second half cycle of the dither period. The prior art further has shown that the average acceleration a (for accelerometers 10 and 12) is defined by the following equation:

$$a_{\frac{1}{2}} = 2\rho\omega P \cos\omega t \pm F \tag{4}$$

where $\rho$ is the maximum dither amplitude, t is time, P is the rate, and F is the specific force along the Z axis (the $\pm$ associated with F is dependent upon which of the two accelerometers of a pair produces the output signal). Equation (4) may be substituted into Equation (3) to determine the two signals $S_1$ and $S_2$ output from accelerometers 10 and 12 when subjected to both a Coriolis acceleration component ($2\rho\omega Pc \cos \omega t$) and a specific force component F. The prior art synchronous demodulation method measures phase differences over the entire dither cycle, determining an incremental change in velocity and incremental change in angular position for each of the X, Y and Z axes every full dither cycle. In making these calculations, the prior art method assumes that the specific force F and rate are substantially constant over the entire dither period, which is typically about 0.01 seconds (for a dither frequency equal to 100 Hz). In addition, the prior art technique disclosed in the above-referenced patent application generally ignores cross-coupling between axes.

The true expansion of the acceleration sensed by an accelerometer along its sensitive axis in a system subject to cross axis coupling wherein both the specific force and angular rate are not constant, is given by the following equation for an accelerometer, $a_1$ or $a_2$, which is dithered in the Y axis:

$$a_1 = 2Py + (PR - \dot{Q})x + (QR + \dot{P})y - (P^2 + Q^2)z + \ddot{z} \pm F \quad (5)$$

where y equals $-\rho \sin \omega t$, $\dot{y}$ equals $-\rho\omega \cos \omega t$, x equals a constant offset of the accelerometer center of percussion, and z equals $$\sqrt{r^2 - y^2},$$

r being the radius of dither motion and $\omega$ being the dither frequency. Similar equations may be developed for the other orthogonal axes along which accelerometers 14 and 16, and 18 and 20 are dithered back and forth. The first term on the right side of Equation (5) corresponds to the Coriolis acceleration component; the second term arises from the centripetal acceleration to which the accelerometer is subject due to the offset of the accelerometer center of percussion from its sensitive axis; the third term corresponds to the oscillatory centripetal acceleration which is in quadrature with the Coriolis acceleration; the fourth term is the centripetal acceleration due to a finite offset of the parallelogram, i.e., the height of the parallelogram above or below the Y axis; the third term is an acceleration along the Z axis due to "double-dipping", which occurs because the accelerometer vibrates back and forth along a slightly curved path due to the geometry of the parallelogram structure in which it is dithered; and, the last term is the linear acceleration (specific force) to which the accelerometer is subject. Again, the sign applied to specific force depends on which accelerometer of the pair is producing the signal.

Thus, it will be apparent that all but the first and the last term of all the terms on the right side of Equation (5) are error components, which must be taken into consideration to accurately determine the angular rate due to Coriolis acceleration, and the specific force F. The prior art signal processing methods have considered those errors but have not provided means to deal with them in highly dynamic environments where they become significant.

Equation (3) may be expanded by substituting for the integration of $K_1a$ over an interval, the value for "a" given in Equation (5), yielding the following:

$$\text{signal} = -2\rho \int P\omega \cos \omega t\, dt + x \int PR\, dt - x \int \dot{Q}\, dt - \rho \int QR \sin \omega t\, dt - \rho \int \dot{P} \sin \omega t\, dt - z \int P^2\, dt - z \int Q^2\, dt + \int F\, dt \quad (6)$$

By selecting the beginning and end time points of the integrals as synchronized with the beginning and end of a quarter cycle of the dither signal, a signal can be generated such that the integrals of $\cos 2n\omega t$ terms are zero. It is possible either to simultaneously solve for the P, Q and R rates, or alternatively to use previously solved values for these rates to determine a solution to Equation (6). Likewise, the linear vibration terms in Equation (6) can be compensated for by solving two coupled general equations relating the observed sensor signal to the incremental change of velocity, and then using the result to solve for an incremental change in angular position. Details of this solution are set forth in the following discussion.

Figure 4:
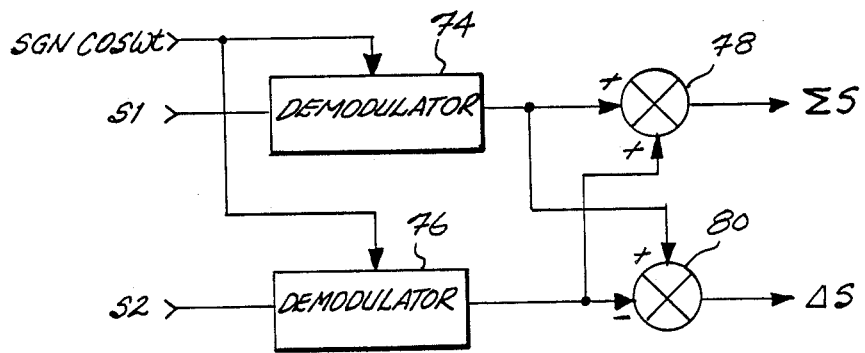
FIG. 4 is a conceptual view illustrating the demodulation of the output signals from a pair of accelerometers, and the combination of the demodulated signals to produce sum and difference signals for calculation of rate according to the prior art.

Turning now to FIG. 4, a conceptual illustration of the preprocessing required of the signals output for rate calculation from each pair of accelerometers 10 and 12, 14 and 16, and 18 and 20 is shown. For example, signal $S_1$ may represent the output signal from accelerometer 10, and signal $S_2$ may represent the output signal from accelerometer 12. In the prior art method, the signals output from the accelerometers were synchronously demodulated over the entire dither cycle. In the present invention, however, these signals are demodulated over a portion of the complete dither cycle, preferably one-quarter of a complete dither period. As noted previously, the output from each accelerometer 10 and 12 comprises a carrier frequency representing the resonant frequency of the quartz crystal used in the accelerometer, which is modulated at a frequency corresponding to the acceleration sensed by the accelerometer. Accordingly, the crystal response relative to the resonant frequency for accelerometers 10 and 12 is approximated by the following equations:

$$F_{11} = K_{11}a_1(1 + K_{21}a_1) \quad (7)$$

$$F_{12} = K_{12}a_1(1 + K_{22}a_2) \quad (8)$$

wherein $K_{11}$ and $K_{21}$ represent gain factors associated with accelerometer 10, and $K_{12}$ and $K_{22}$ represent gain factors associated with accelerometer 12. The values $a_1$ and $a_2$ correspond to the sensed acceleration from the two accelerometers and may be separated into two components representing a rate dependent term, $a_p$, and a specific force term, F, as follows.

$$a_1 = a_p + F \quad (9)$$

$$a_2 = a_p - F \quad (10)$$

The outputs from accelerometers 10 and 12 are periodic signals which are appropriately demodulated for rate channel calculations in the prior art by the function SGN $\cos \omega t$ using demodulators 74 and 76. The symbol SGN means "sign of", i.e., + or −. Demodulators 74 and 76 accumulate counts corresponding to the integrated frequencies $F_{11}$ and $F_{12}$ of Equations (7) and (8) above, respectively, during a fractional portion of the dither cycle, e.g., from $t_1$ through $t_2$, as shown in FIG. 3. The integration of the frequencies $F_{11}$ and $F_{12}$, which results from accumulating counts, may be expanded by substitution of the right side of Equations (9) and (10) for the values of $a_1$ and $a_2$ in Equations (7) and (8). A summing junction 78 is used to add the integrated frequency, i.e., the counts output from demodulators 74 and 76, and a summing junction 80 subtracts those counts, providing sum and difference signals, $\Sigma S$ and $\Delta S$. In the present invention, the values for $\Sigma S$ and $\Delta S$ are determined in software using the accumulated counts integrated for a time determined by the signal $\sin \omega t_n - \sin \omega t_{n-1}$, which changes to $\pm 1$ every quarter dither period.

Figure 6:
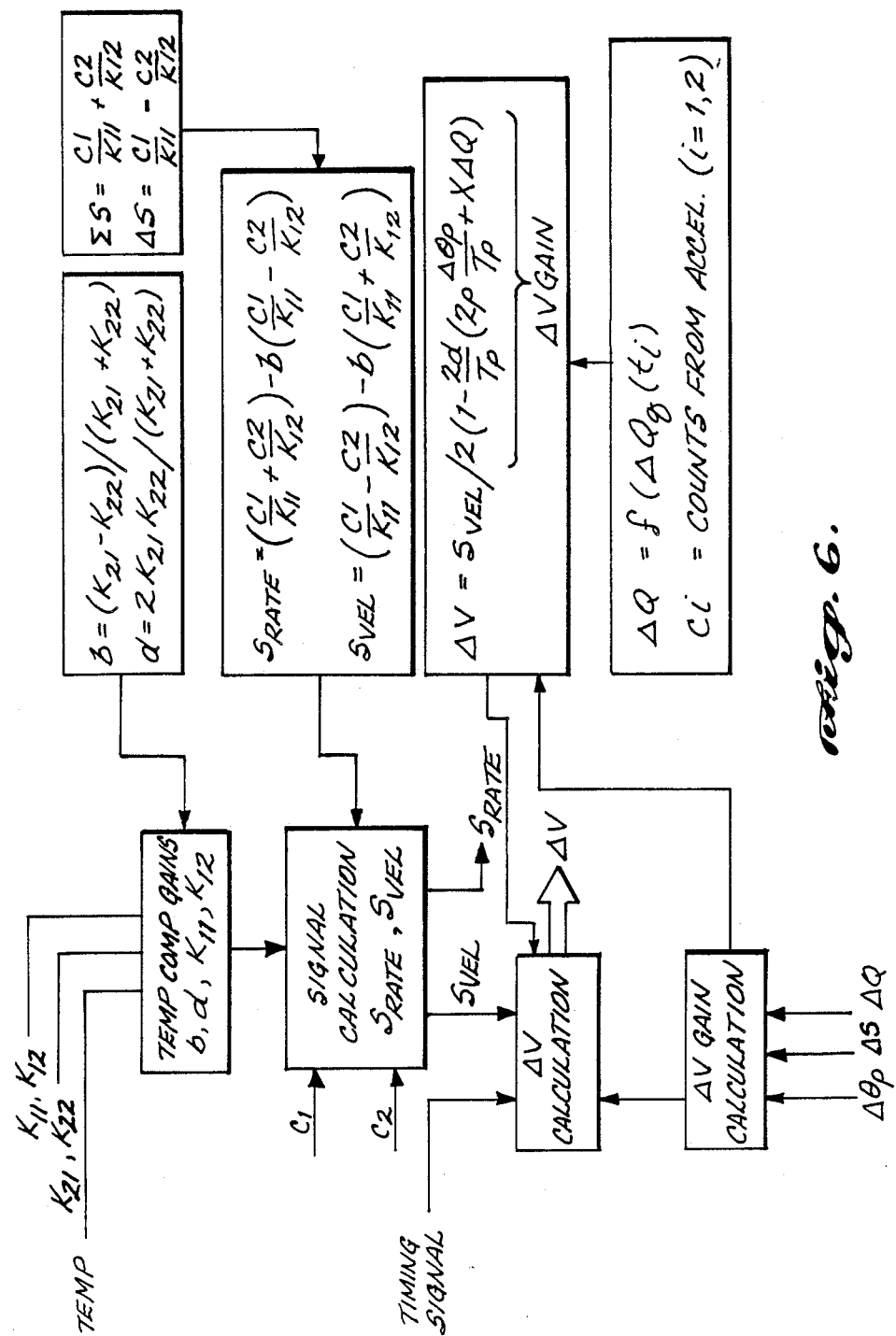
FIG. 6 is a chart illustrating the steps for calculating incremental change in velocity as a function of the output signals from a pair of accelerometers.

To simplify the calculation of angular rate and linear acceleration, the values for $\Sigma S$ and $\Delta S$ in the present invention can be combined as shown in the following equations:

$$\Sigma S - b\Delta S = 2\int (a_p + da_p{}^2)dt - 2\int(bF - dF^2)dt \quad (11)$$

$$\Delta S - b\Sigma S = 2\int F(1 + da_p)dt - 2b\int a_p dt \quad (12)$$

where b and d are ratios of the gain constants $K_{21}$ and $K_{22}$ (see FIG. 6). The left side of Equation (11) is referred to as $S_{rate}$ and the left side of Equation (12) as $S_{vel}$ in the following discussion. Combination of the sum and difference signals from summing junctions 78 and 80, as shown in Equations (11) and (12), eliminates terms resulting from cross-coupling between the Coriolis acceleration and the specific force sensed by accelerometers 10 and 12. Equation (12) can be solved for an incremental change in velocity, and Equation (11) may be solved for the incremental change in angular position about the X axis, over the fractional one-quarter cycle of the dither period.

In the prior art solution for angular rate and linear acceleration, Equations (11) and (12) are decoupled in a full wave demodulation, by summing over a full cosine period of the dither drive signal, and Equation (11) is solved by subtracting counts accumulated during one-half of the dither cycle from the counts during the other one-half. If the body to which the accelerometers are attached experiences motion at a frequency much less than the dither frequency, errors of the prior art solution are generally less than $\pm 0.01$ percent. However, should the body be subject to high frequency dynamic acceleration and changes in rotation rate about the orthogonal X, Y and Z axes, at a frequency substantially higher than the 100 Hz dither drive signal, the prior art method of solving for angular rotation and linear acceleration yields significant error.

The present invention provides an apparatus and method which decouples Equations (11) and (12) to reduce the effects of nonlinearities in solving for an incremental change in angle and incremental change in velocity. In addition, determining these values during one-quarter cycle of the complete dither period increases the data rate by a factor of four over the full cycle demodulation of the prior art.

Determination of the angular rate, P, associated with accelerometers 10 and 12 and the specific force, F, that is directed along their sensitive axes involves a two-step process. Initially, a value for the incremental change in velocity, $\Delta V$, is obtained, and then this value is used to solve a more complex equation to determine the incremental changes in angular position, $\Delta \theta$. It will be apparent that the incremental changes in velocity and angular position may be divided by the time interval during which those changes occur, yielding the angular rate of rotation and specific force measured by the pair of accelerometers from which the data is derived.

Using Equation (12), the following expression may be derived to solve for the incremental change in velocity:

$$\Delta V = \frac{[\Delta S - b(\Sigma S + 4\rho\Delta\theta_p(\sin\omega t_p - \sin\omega t_{p-1})/T_p + 2x\Delta Q)]}{2\left(1 - \dfrac{d}{T_p}\left(2\dfrac{\rho\Delta\theta_p}{T_p}(\sin\omega t_p - \sin\omega t_{p-1}) + x\Delta Q\right)\right)} \quad (13)$$

wherein $T_p$ represents an interval of time equal to one-quarter of the complete dither period of accelerometers 10 and 12 as they vibrate back and forth along the Y axis, and $t_p$ and $t_{p-1}$ represent points in time $\frac{1}{4}$ dither period apart. Since $t_p$ and $t_{p-1}$ fall on zero crossings of the $\sin \omega$ waveform, the value of $\sin \omega t_p - \sin \omega t_{p-1}$ will either be $+1$ or $-1$. The terms in Equation (13), that include $\Delta \theta_p$ can either be neglected, or a value for the incremental change in angular position about the X axis from a previous fractional portion can be used as an estimate in calculating $\Delta V$. Since the incremental change of angular position, $\Delta \theta_p$, very weakly couples to the incremental change in angular velocity, $\Delta V$, it is generally acceptable to ignore those terms in which $\Delta \theta_p$ occurs. One of the terms which cannot be ignored is $\Delta Qx$. This term involves the coupling of angular rate about the Y axis and is equal to the integral of x Q dt over the $\frac{1}{4}$ cycle fractional interval of time. If this integral is expanded using Taylor's expansion, the following equation is obtained:

$$\Delta Qx = \int xQ dt = x\left\{(\Delta\theta_q - \Delta\theta_{q-1})\frac{T_p}{T_Q} + \right.$$

$$\left. (Q_q - 2Q_{q-1} + Q_{q-2})\frac{T_p}{T_Q{}^2}(1/2(t_p + t_{p-1}) - t_{q-1})\right\} \quad (14)$$

wherein $T_p$ and $T_Q$ are the $\frac{1}{4}$ dither periods for the X and Y rate axes associated with pairs of accelerometers 10 and 12, and 14 and 16, respectively, and $t_p$ and $t_q$ represent the current time of measurement for those accelerometer pairs. $\Delta\theta_q$ and $\Delta\theta_{q-1}$ comprise the difference between the incremental change in angular position around the Y axis during the current fractional portion of the ditheral period between $t_q$ and $t_{q-1}$ and $Q_q$, $Q_{q-1}$ and $Q_{q-2}$ represent the angular rate determined for the Y axis during two successive $\frac{1}{4}$ cycle portions, $T_Q$ from time, $t_{q-2}$ through $t_q$. Of course, it is also possible to estimate a value for $\Delta Q$ in terms of an average $\dot{Q}$ over one or more preceding quarter periods. If the values for $\Delta V$ and $\Delta \theta$ are solved for each of the three orthogonal axes, X, Y and Z, simultaneously, three equations for $\Delta V$ along each of the orthogonal axes similar to Equation (13) can be solved simultaneously to determine the value of $\Delta Q$.

Figure 5:
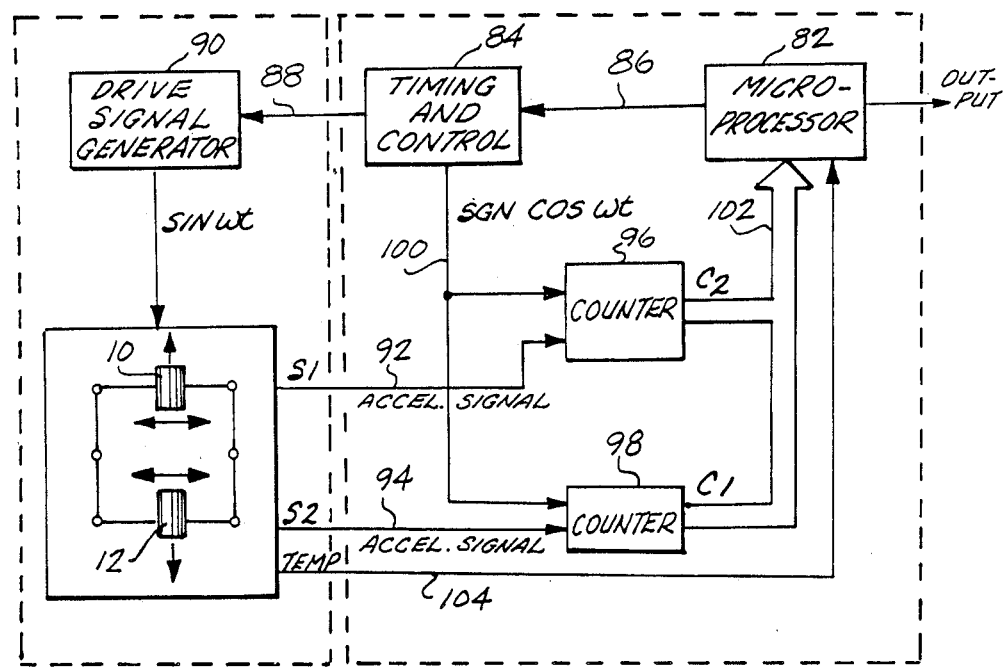
FIG. 5 is a block diagram of a system for determining the angular rate from the accelerometer output signals.

The apparatus used to process the output signals from the pairs of accelerometers and to develop a solution to the equation discussed above is shown in FIG. 5. The most important element of the signal processing system is microprocessor 82. Although not specifically shown, the microprocessor includes random access memory (RAM) and read-only memory (ROM), the latter serving to store a digital program for implementing the steps to process the output signals from each pair of accelerometers. Microprocessor 82 is connected to a timing and control block 84 by leads 86, through which control signals are provided to establish a predetermined time relationship for the periodic frequencies used to drive each pair of accelerometers to vibrate back and forth. Only one pair of accelerometers 10 and 12 is shown in FIG. 5. However, it will be understood that accelerometers 14 and 16, and 18 and 20 are similarly connected to and controlled by microprocessor 82 and timing and control block 84.

Control signals are provided by the timing and control block to establish the periodic driving frequency and its phase relationship, for each pair of accelerometers, and are input to a drive signal generator 90. Drive signal generator 90 is electromagnetically coupled to accelerometers 10 and 12, causing them to dither or vibrate back and forth at a frequency $\omega$, according to the periodic function $\sin \omega t$. The value of $\omega$ may be the same for all pairs of accelerometers operating in a synchronous rate sensor, or different for each pair in an asynchronous rate sensor. In response to both linear acceleration and a Coriolis acceleration due to angular rotation around their associated rate axis, a pair of accelerometers produces output signals $S_1$ and $S_2$ which are input over lines 92 and 94 to counters 96 and 98, respectively.

The signals $S_1$ and $S_2$ are demodulated by a signal SGN $\cos \omega t$ as explained above, which is provided through leads 100 from timing and control block 84. The demodulated output from counters 96 and 98 are counts $C_1$ and $C_2$, which are input to microprocessor 82 through data lines 102. A thermister is used to sense the temperature in the environment to which the accelerometers 10 and 12 are exposed, so that an appropriate temperature gain factor may be incorporated in solving for linear acceleration and angular rate. The output of the temperature sensor (not shown) is input to microprocessor 82 over leads 104.

Microprocessor 82 implements a series of program steps to calculate a value for $\Delta V$, the incremental change in velocity along each axis, as generally shown in FIG. 6 relative to the Z axis. Stored in memory on the processor are a set of characteristic gain constants associated with each accelerometer determined as a function of temperature. As noted above, these gain constants are $K_{11}$, $K_{12}$, $K_{21}$ and $K_{22}$. Microprocessor 82 determines two constants, "b" and "d" as a function of the gain constants, as shown in FIG. 6, and then uses these constants, b and d, to calculate $S_{rate}$ and $S_{vel}$ as functions of the counts $C_1$ and $C_2$ output by counters 96 and 98. As noted above, the value $S_{rate}$ is equivalent to the left side of Equation (11), i.e., $\Sigma S - b\Delta S$. Likewise, $S_{vel}$ corresponds to the left side of Equation (12), i.e., $\Delta S - b\Sigma S$.

The expression for $\Delta V$ shown in FIG. 6 is a simplified form of Equation (13). The denominator of that expression corresponds to the $\Delta V$ gain for the pair of accelerometers, which must be determined as a function of $\Delta \theta_p$, $S_{vel}$ and $\Delta Q$ as already explained. Once $\Delta V$ gain is determined, the equation for $\Delta V$ is readily solved.

Equation (13) can be solved for successive fractional increments of an entire dither period, providing data reflecting the rapid change of velocity, i.e., acceleration along each of the X, Y and Z axes. Values for $\Delta V$ for each of those axes may then be used to solve for $\Delta \theta$ for each axis as will be explained below. Alternatively, the average incremental change in velocity over successive fractional incremental portions of the dither cycle may be determined to filter out short-term variations in acceleration, and to simplify the solution of Equation (13).

If $\Delta V$ is determined for each quarter dither cycle, the sum of four successive such $\Delta V$ values yields the following equation:

$$\Delta V_{100} = \frac{\sum_{i=1}^{4}(\Delta S - b\Sigma S) - 2bx\Delta Q_{100}}{2\left(1 - \frac{d}{T} \times \Delta Q_{100}\right)} \quad (15)$$

where the dither frequency is equal to 100 Hz. In Equation (15), $$\Delta Q_{100} = Q(t_p) - Q(t_p - 4T_p) \quad (16)$$

$$T = 4T_p = 2\pi/\omega \quad (17)$$

where $Q(t_p)$ is the rate, Q, for the current $\frac{1}{4}$ dither cycle and $Q(t_p - 4T_p)$ is the rate, Q, determined at a $\frac{1}{4}$ cycle occurring one dither period earlier in time. The value $\Delta V_{100}$ thus comprises a running average of the incremental change in velocity for accelerometers 10 and 12, in which the value of $\Delta Q_{100}$ is determined either by estimating the current angular rate at time $t_p$ or by calculating it simultaneously.

The incremental change in angular position $\Delta \theta$ is determined by solving Equation (11) for each quarter dither cycle. The right-hand side of Equation (11) comprises the sum and difference of signal counts $C_1$ and $C_2$ and an error term due to the coupling of specific force into the Coriolis acceleration. This coupling is due to the nonlinearity of the accelerometers. In the prior art, the coupling component was ignored by assuming a constant linear acceleration over a full dither period. Cosine demodulation thus cancels linear acceleration coupling occurring during the first half period against that occurring in the second half period of the dither cycle. In a dynamic environment, wherein a body is subject to rapid changes in angular acceleration, linear acceleration is not constant over a full dither period. Accordingly, the coupling of linear acceleration with angular rate does not cancel and cannot be ignored if an accurate solution is required.

In the present invention, compensation is provided for the linear acceleration (specific force) coupling by estimation of its effect from the history of incremental velocity in preceding fractional portions of the dither cycle. From the second integral of Equation (11), the specific force coupling over $\frac{1}{4}$ dither period is given by the following equation.

$$F \text{ couple} = \int_{t_p-1}^{t_p}(bF - dF^2)\,dt \quad (18)$$

The integral in Equation (18) can be evaluated to yield:

$$\int_{t_p-1}^{t_p}(bF - dF^2)dt = \quad (19)$$

$$b\Delta V_p - \frac{d}{T_p 12}\{13\Delta V_p^2 - 2\Delta V_p V_{p-1} - \Delta V_{p-1}^2\}$$

where we assume that the average specific force, F, over the period of integration is equal to $\Delta V$ divided by $T_p$. The right side of Equation (19) may be readily evaluated because we have already solved Equation (13) for $\Delta V_p$ and $\Delta V_{p-1}$.

The first group of terms, i.e., the integrand of the first integral, on the right-hand side of Equation (11) may be expanded to isolate the remaining terms of the desired angular rate as follows:

$$(a_p + da_p^2) = dz^2 P^4 + d(4\rho z\omega\cos\omega t - 2xzR)P^3 + \qquad (20)$$
$$(-z + d\, 2\rho^2\omega^2)P^2 + (-2\rho\omega\cos\omega t + xR)P +$$
$$d(4\rho xQ + 4\rho zQ^2 + 2\rho^2\epsilon_1\phi\omega^2)\omega\cos\omega tp +$$
$$xQ - \rho QR\sin\omega t - zQ^2 - \rho P\sin\omega t + d\, 1/2\rho^2\phi^2\omega^4\epsilon_1^2$$

where $\epsilon_1 = (1 + \frac{1}{4}\phi^2 + 15/128\phi^4)$, and $\epsilon_2 = 1 + 3/64\phi^2$; $\phi = \rho/r$. Equation (20) clearly includes a number of terms other than the Coriolis acceleration. These other terms represent error and therefore must be subtracted to yield the desired corrected information pertaining to angular rate. The term, $dz^2 P^4$, corresponds to a nonlinear coupling of centripetal acceleration resulting from the dither motion of the accelerometers as they vibrate back and forth. The term, $d4\rho z P^3 \omega \cos \omega t$, represents a nonlinear cross-coupling of Coriolis acceleration and centripetal acceleration. The term, $-2dxzRP^2$, is a nonlinear cross-coupling between the angular rates, R, and angular rate, P, centripetal terms. The term, $-zP^2$, corresponds to the angular rate, P, centripetal acceleration. The term, $d2\rho^2\omega^2 P^2$, is a DC component of the Coriolis acceleration squared. The term, $-2\rho \cos \omega t$, is, in fact, the Coriolis acceleration. The term, $xRP$, is centripetal acceleration coupling between the R and P angular rates. The term, $d4\rho x\, Q\omega \cos \omega tP$, represents nonlinear cross-coupling between the Q axis vibration, centripetal acceleration, and Coriolis acceleration. The term, $d4\rho zQ^2\omega \cos \omega tP$, represents nonlinear cross-coupling between $Q_{rate}$, centripetal, and Coriolis accelerations. The term $d2\rho^2 \epsilon_1\phi\omega^3 \cos \omega tP$ is a nonlinear crosscouple between body accelerations z and Coriolis acceleration. The last term is a nonlinear cross-coupling between the acceleration of the body, z, and the Coriolis acceleration at the third harmonic of the dither frequency. In Equation (20), several relatively negligible terms have been neglected.

To determine Coriolis acceleration from Equation (11), it is necessary to evaluate each of the error terms noted above in the integration of Equation (20), by estimating their contribution using past values of the incremental change in angular position for all three rate axes, P, Q and R. There are several techniques that may be used for estimating each error term in Equation (20), which are generally well known to those of ordinary skill in the art. A detailed evaluation of each term is not presented herein, since it is not necessary to explain these techniques to properly disclose the present invention.

Equation (11) can be solved for each quarter cycle of the complete dither period for each of the rate axes X, Y and Z. Alternatively, a running average of the incremental change in position, $\Delta\theta$, about each of these axes can be determined in terms of real roots of the following biquadratic, fourth order polynomial equation:

$$C_4 \bar{P}^4 + C_3 \bar{P}^3 + C_2 \bar{P}^2 + C_1 \bar{P}^1 + C_0 \bar{P}^0 = 0 \qquad (21)$$

The average rate determined for the incremental change in angular position over the summation period (preferably a running average taken for four successive quarter cycle portions of the dither period) is one of the two real roots of Equation (21). For any realizable system, the real root of minimum absolute value is the actual desired solution. Equation (21) can be solved for its singular desired solution by using commonly known techniques. The coefficients in Equation (21) are derived from the integrations carried out in Equation (11). Equation (19) evaluates the specific force coupling portion (the second integral) of Equation (11), while Equation (20) represents the integrand of the first integral of Equation (11).

In general, the coefficients $C_0$ through $C_4$ can be determined using estimates of the inertial rates derived from preceding quarter cycle portions of the dither period:

$$C_4 = dz^2 T_p \qquad (22)$$

$$C_3 = d(4\rho z(\sin(\omega t_n) - \sin(\omega t_{n-1})) - 2xz\widetilde{R}T_p) \qquad (23)$$

$$C_2 = (-z + d2\rho^2\omega^2)T_p \qquad (24)$$

$$C_1 = -2\rho(\sin(\omega t_n) - \sin(\omega t_{n-1})) + x\widetilde{R}T_p + 4d(\rho x\bar{Q} + \rho z\bar{Q}^2 + \rho^2\phi\omega^2(\frac{1}{3}\epsilon_1 - 1 - /24\epsilon_2\phi^2)) \qquad (25)$$

$$C_0 = xQT_p - zQ^2T_p - \rho\frac{(QR + P)}{\omega}(\cos(\omega t_n) - \qquad (26)$$
$$\cos(\omega t_{n-1})) + d\, 1/2\, \rho^2\phi^2\omega^4\epsilon_1^2 T_p -$$
$$b\Delta V(t_n) + \frac{d}{T_p\, 12}\{13\Delta V(t_n) - 2\Delta V(t_n)\Delta V(t_{n-1}) +$$
$$\Delta V^2(t_{n-1})\} - (\Sigma S - b\Delta S)$$

In the above Equations (22) through (26), the coefficients are determined from the prior history of angular rate which provide values for $\widetilde{R}$ and $\bar{Q}$, and the present values of the incremental change in angular velocity, $\Delta V$, determined for the current quarter dither period, at $t_n$, and for the previous quarter period, at $t_{n-1}$.

Figure 7:
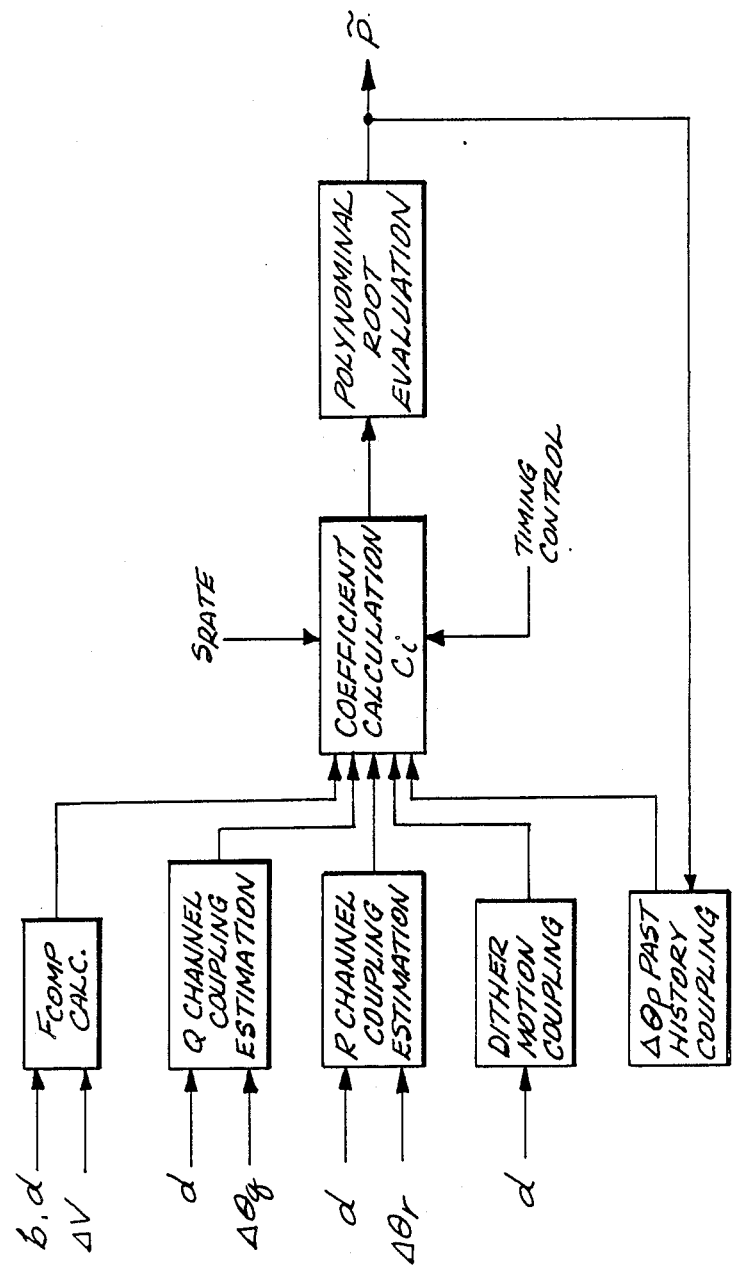
FIG. 7 is a block diagram showing the steps used in calculating the rate for one axis as a function of the incremental change in velocity and of cross-axis coupling.

FIG. 7 diagrammatically illustrates the process for determining angular rate, $\bar{P}$. The microprocessor 82 references the values for b and d, determined as a function of temperature dependent gain constants, as previously explained, and uses those values and the $\Delta V$ previously calculated, to determine the specific force component, F. Likewise, an estimate of the Q rate and R rate couple error contributions are made using d and $\Delta\theta_q$, and d and $\Delta\theta_r$, respectively. Dither motion coupled error is estimated based on d. Finally, the error coupled from $\Delta\theta_p$ is estimated based on past history, i.e. prior quarter period results. Each of these terms are then used with $S_{rate}$ to calculate the coefficients of Equation (21). Microprocessor 82 solves for the desired real root of that equation to obtain $\Delta\theta_p$ and divides by the dither $\frac{1}{4}$ cycle fractional period, $T_p$, to obtain $\bar{P}$. This value of $\bar{P}$ is used to update the history of $\Delta\theta_p$. The other rates $\bar{Q}$ and $\widetilde{R}$ are determined in a similar fashion.

In a synchronous system involving three pairs of accelerometers dithered at the same frequency $\sin \omega t$, six simultaneous nonlinear equations for the three $\Delta V$ and $\Delta\theta$ values corresponding to the three orthogonal axes are obtained. As previously explained, the equations for $\Delta V$ can be decoupled from the equation describing the output from each accelerometer and solved first. The three equations for $\Delta\theta$ are then solved using the results for the ΔV. Although one method has been outlined above, it is also possible to obtain a solution using other methods, such as by linearization through perturbations, or by using iteration to arrive at a solution within acceptable limits of error.

Figure 8:
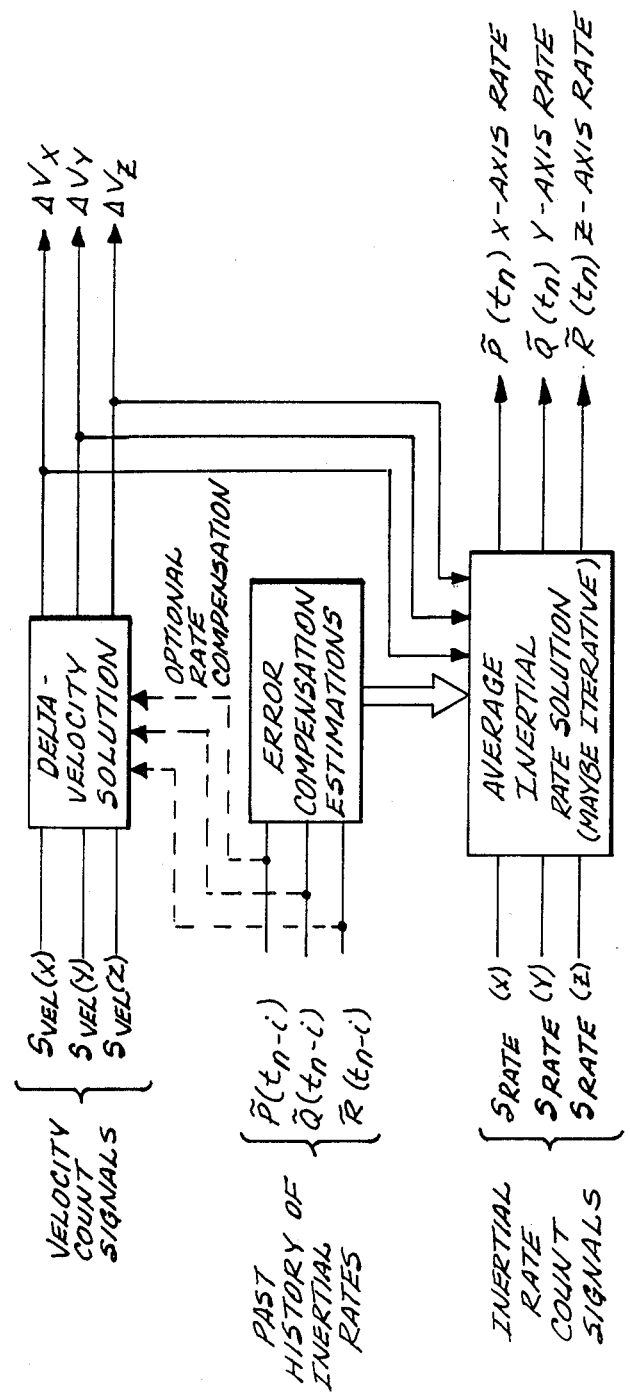
FIG. 8 is a block diagram illustrating a synchronous rate sensor implementation of the present invention to determine an incremental change in velocity for each of three orthogonal axes and an average angular rate of rotation component for the three axes, for a quarter cycle of a complete dither period.

FIG. 8 illustrates conceptually how the incremental changes in velocity for the X, Y and Z axes are obtained in a synchronous rate sensor. Microprocessor 82 uses an error compensation estimate derived from the past history of the inertial rates $\bar{P}$, $\bar{Q}$ and $\bar{R}$, using a prior quarter cycle portion at $t_{n-1}$ of the dither period. The error compensation estimates are combined with the $S_{rate}$ and the ΔV for each of the X, Y and Z axes to calculate the average inertial angular rate $\bar{P}$, $\bar{Q}$, and $\bar{R}$ for the current quarter dither cycle of the orthogonal rate axes. The use of the present invention to process the data output from the accelerometers of a synchronous rate sensor provides a more accurate solution than when used to process data from an asynchronous rate sensor.

Figure 9:
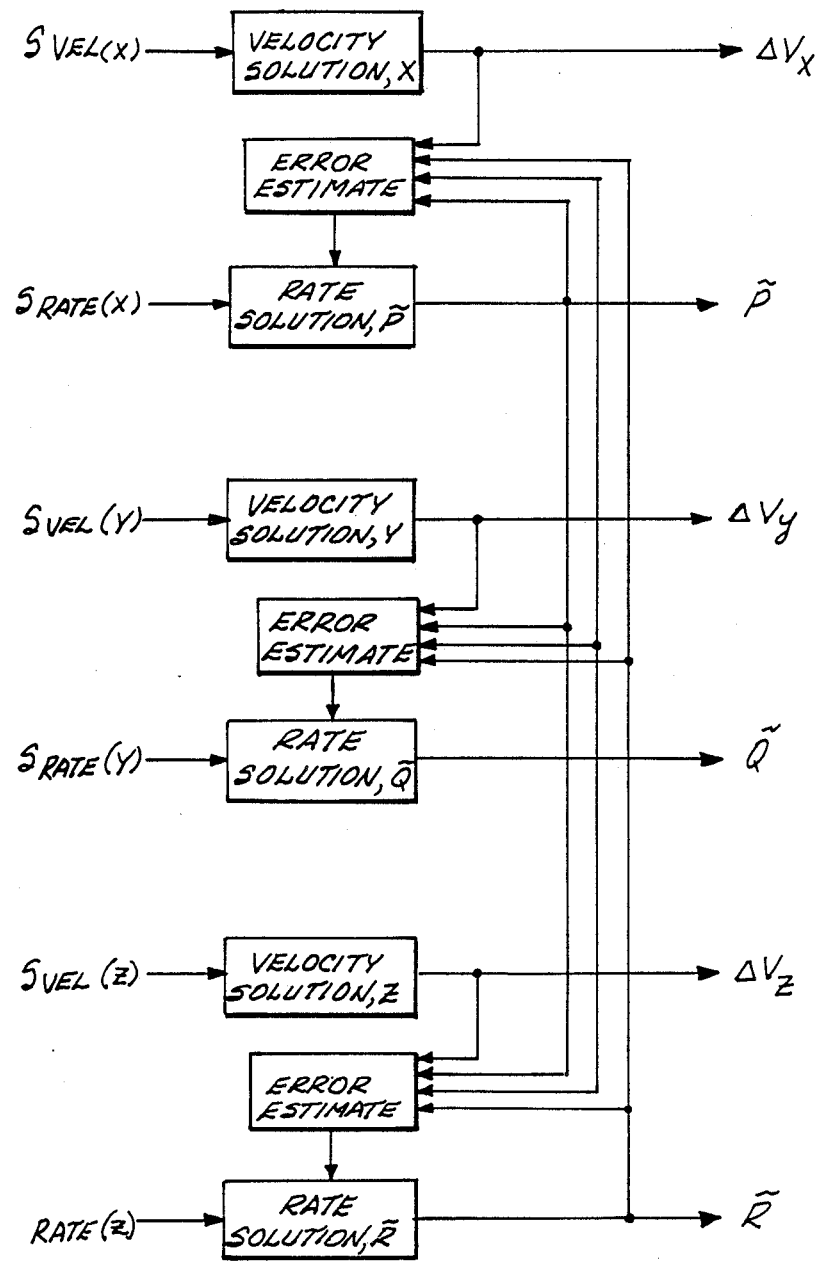
FIG. 9 schematically illustrates an asynchronous rate sensor implementation of the present invention for determining an incremental change in velocity for each of three orthogonal axes and an average angular rate of rotation for those axes based upon an estimated error from previous quarter cycle portions of complete dither periods.

The method used to solve for linear accelerations and angular rates for an asynchronous rate sensor system wherein the pairs of accelerometers are driven at different frequencies is conceptually illustrated in FIG. 9. Again, the first step is to determine the incremental change in velocity for each axis. Then, the estimated error due to cross-coupling is computed using the most recent solution in time for each of the other rate axes. Finally, the average rate for each of the rate axes is obtained by solving Equation (21).

Although each of the above solutions for incremental change in velocity and incremental change in angular position have been related to a system in which three pairs of accelerometers are used, an analogous technique may be used to solve for the linear acceleration and angular rate of rotation associated with a single pair of accelerometers. For a single pair of accelerometers 10 and 12, which are dithered along the Y axis with their sensitive axes aligned with the Z axis, all terms of Equations 13, 19 and 20 based on the two perpendicular average inertial rates $\bar{R}$ and $\bar{Q}$ as well as terms related to the angular acceleration Q will be unobservable. However, error components resulting from the coupling of specific force to angular rate and body dither resulting from nonlinearities of the crystals used in the accelerometers will still be observable. In addition, an inertial angular acceleration in the sensed rate will also be observable. Accordingly, these error components may be resolved or estimated based on prior solutions during previous fractional portions of the dither cycle, so that the improved data rate and the remaining errors due to coupling may be eliminated in determining linear acceleration and angular rate for the single accelerometer pair. The methods used to solve for angular rate and linear acceleration discussed above are approximate in nature (e.g., Taylor series expansions) and work well because they determine relatively small residual errors not addressed fully by the prior art techniques, at least to the extent that the small errors do not mostly cancel out over each full cycle.

The preferred embodiments of the present invention use a fractional portion of the dither cycle equal to one-quarter of the complete period. It would also be possible to use smaller incremental portions, e.g., one-eighth or one-sixteenth of the complete dither cycle, to achieve even higher resolution of the changes in angular acceleration and linear acceleration. However, the real-time calculation of this data is limited by the processing speed of presently available microprocessors. Accordingly, as faster microprocessors are developed and become commercially available, it is contemplated that increased resolution may be achieved by using shorter incremental portions of the dither cycle.

While the present invention has been disclosed with respect to the preferred embodiments, those of ordinary skill in the art will appreciate that modifications to the apparatus and methods disclosed hereinabove may be made within the scope of the claims that follow hereinbelow. Accordingly, it is not intended that the scope of this invention be in any way limited by the disclosure, but instead, it should be determined solely by reference to the claims.

The embodiments of the invention in which an exclusive property or privilege is claimed are defined as follows:

1. Apparatus for processing signals produced by an angular rate and linear acceleration sensor to determine an angular rate of rotation and a linear acceleration of a body, said sensor including a pair of accelerometers having their sensitive axes aligned in parallel with each other and orthogonal to a rate axis about which the angular rate of rotation of the body is sensed by periodically moving the pair of accelerometers in a direction orthogonal to both the sensitive axes of the accelerometers and to the rate axis as a function of a periodic movement signal, whereby a Coriolis acceleration proportional to the angular rate of rotation about the rate axis and aligned in the direction of the sensitive axes results, said accelerometers each producing an output signal proportional to the combined linear and Coriolis accelerations to which they are subjected along their sensitive axes, said apparatus comprising:
   (a) summing means for determining a sum and a difference of the output signals produced by the pair of accelerometers during a fractional portion of a complete period of the movement signal;
   (b) processing means for determining as a function of said sum and difference:
      (i) an incremental change in velocity of the body along a sensitive axis of the body that is aligned with the sensitive axes of the accelerometers; and
      (ii) an incremental change in angular position of the body about the rate axis; with
   (c) said processing means including means for correcting said incremental change in angular position for cross-coupling of an error component of the incremental change in velocity, and means for determining the angular rate of rotation of the body about the rate axis and the linear acceleration of the body along the sensitive axis, as a function of:
      (i) the corrected incremental change in angular position,
      (ii) the incremental change in velocity, and
      (iii) a duration of said fractional portion of the period of the movement signal.

2. The apparatus of claim 1, wherein said processing means are further operative to compute a running average of the incremental changes in velocity and angular position for successive fractional portions of the movement signal.

3. The apparatus of claim 1, wherein the fractional portion of the movement signal comprises one fourth of the complete period of the movement signal.

4. The apparatus of claim 3, wherein said processing means estimates the error component of the incremental change in velocity based on an incremental change in velocity determined during a previous fractional portion of the movement signal.

5. Apparatus for processing signals produced by an angular rate and linear acceleration sensor to determine an angular rate of rotation of a body about a linear acceleration along each of a plurality of rate axes, said sensor including a plurality of pairs of accelerometers, each accelerometer of a pair having its sensitive axis aligned in parallel with the sensitive axis of the other and orthogonal to a rate axis of the plurality of rate axes with which the pair is associated and about which the angular rate of rotation of a body is sensed by moving the pair of accelerometers in a periodic motion directed orthogonally to both the sensitive axes of the pair of accelerometers and to their associated rate axis as a function of a periodic movement signal, whereby a Coriolis accleration proportional to the angular rate of rotation about the rate axis and aligned in the direction of the sensitive axes results, said accelerometers each producing an output signal proportional to the combined linear and Coriolis accelerations to which they are subjected along their sensitive axes, said apparatus comprising:
(a) means for determining a sum and a difference of the output signals from each pair of accelerometers during a fractional portion of a complete period of the movement signal;
(b) processing means for determining as a function of said sum and difference for each pair of accelerometers:
  (i) an incremental change in velocity of the body along the sensitive axis of each pair of accelerometers, and
  (ii) an incremental change in angular position of the body about the rate axis associated with each pair of accelerometers; with
(c) said processing means including means for correcting the incremental changes in angular position and angular velocity for each pair of accelerometers by determining and subtracting therefrom cross-axis and cross-coupling error components, and means for determining the angular rate of rotation of the body about each of the rate axes and the linear acceleration of the body along each of the sensitive axes, as a function of:
  (i) the corrected incremental change in angular position,
  (ii) the corrected incremental change in velocity, and
  (iii) a duration of said fractional portion of the period of the movement signal.

6. The apparatus of claim 5, wherein the fractional portion of the movement signal comprises one fourth of the complete period.

7. The apparatus of claim 5, wherein said processing means are further operative to determine a running average of the incremental changes in angular position and of the incremental changes in velocity for each of the rate axes, for successive fractional portions of the movement signal.

8. The apparatus of claim 5, wherein said processing means are further operative to estimate the cross-axis and cross-coupling error components for the incremental change in angular position and velocity of each rate axis, based on an incremental change in angular position and velocity for that rate axis determined from a preceding fractional portion of the movement signal.

9. The apparatus of claim 5, wherein the cross-axis and cross-coupling error components comprise cross-axis vibrations and nonlinear motion of the accelerometer pairs.

10. Apparatus for determining components of an angular rate of rotation of a body about a plurality of orthogonal rate axes and of a linear acceleration of the body along the rate axes, comprising:
(a) a plurality of pairs of accelerometers, each pair of accelerometers being associated with an angular rate of rotation about one of the rate axes, with the sensitive axes of the accelerometers comprising each pair being aligned in parallel with each other and perpendicular to said one rate axis with which that pair is associated, each accelerometer producing an output signal having a frequency corresponding to an acceleration sensed by said accelerometer along its sensitive axis;
(b) driver means, including means for producing a periodic movement signal, for periodically moving each pair of accelerometers as a function of the periodic movement signal, in a direction generally orthogonal both to the sensitive axes of the pair of accelerometers and to the rate axis with which the pair of accelerometers is associated, so that the output signal from each accelerometer of the pair includes a periodic Coriolis acceleration component that is proportional to the angular rate of rotation of the body about the rate axis with which the pair of accelerometers is associated; and
(c) signal processing means, connected to receive the output signals from each accelerometer and the periodic movement signal, for determining an incremental change in velocity and an incremental change in angular position of the body along each of the rate axes for a fractional portion of a complete period of the periodic movement signal as a function of the sum and difference of the output signals of each pair of accelerometers, said incremental changes in velocity and angular position for each of the rate axes including cross-axis components from each of the other rate axes, said signal processing means being further operative to determine the cross-axis components and to subtract their contribution, producing a corrected incremental change in velocity and incremental change in angular position for each rate axis, and further operative to determine as a function of the corrected incremental change of velocity and angular position and the duration of the fractional portion of the periodic movement signal, the linear acceleration and angular rate of rotation for each rate axis.

11. The apparatus of claim 10, wherein the fractional portion of the movement signal comprises one fourth of the complete period of the movement signal.

12. The apparatus of claim 10, wherein the means for producing a periodic movement signal produces a movement signal having a different frequency for each of the pairs of accelerometers.

13. The apparatus of claim 10, wherein the incremental changes in velocity and angular position for each rate axis include error components of the incremental changes in velocity along the other rate axes, and wherein the signal processing means are further operative to determine said error components and to correct the incremental changes in velocity and angular position for each rate axis for said error components.

14. The apparatus of claim 13, wherein the signal processing means are further operative to determine a running average of the incremental changes in velocity and angular position for each rate axis, for successive fractional portions of the movement signal.

15. The apparatus of claim 14, wherein the signal processing means are further operative to estimate the cross-axis components and cross-coupling error components of the incremental changes in velocity for each of the rate axes, based on the incremental changes in velocity and angular position determined during a preceding fractional portion of the movement signal.

16. A method for determining the rate of angular rotation of a body about a rate axis and of determining its linear acceleration along an axis perpendicular to the rate axis, comprising the steps of:
 (a) providing a pair of accelerometers having their sensitive axes aligned in parallel with the axis along which the linear acceleration is to be determined and orthogonal to the rate axis;
 (b) periodically moving the accelerometers in a direction orthogonal to both their sensitive axes and the rate axis as a function of a periodic movement signal, said accelerometers producing an output signal, which is a function of the combined linear acceleration, and the rate of rotation about the rate axis;
 (c) subtracting the output signals of the two accelerometers to produce a difference signal;
 (d) adding the output signals of the two accelerometers to produce a sum signal;
 (e) determining an incremental change in velocity of the body along the sensitive axes as a function of the sum and difference signals during a fractional portion of a complete period of the periodic movement signal;
 (f) determining an incremental change in angular position of the body about the rate axis as a function of the sum and difference signals;
 (g) determining an error component of the incremental change in velocity that cross couples into the incremental change in angular position;
 (h) correcting the incremental change in angular position for the error component of the incremental change of velocity; and
 (i) determining the angular rate of rotation and the linear acceleration of the body relative to the rate axis and sensitive axes, respectively, as a function of:
  (i) the corrected incremental change in angular position,
  (ii) the incremental change in velocity, and
  (iii) the duration of the fractional portion of the period of the movement signal.

17. The method of claim 16, wherein angular rate of rotation and linear acceleration are determined at a measurement rate that is at least four times the frequency of the movement signal.

18. The method of claim 16, further comprising the steps of determining a running average of the incremental changes in velocity and of the incremental changes in the angular position during successive fractional portions of the movement signal.

19. The method of claim 18, wherein the step of determining the error component comprises the step of estimating the error component based on an incremental change in velocity and an incremental change in angular position from a preceding fractional portion of the movement signal.

20. A method for determining the rate of angular rotation of a body about a plurality of orthogonal rate axes and determining its linear acceleration along each of the rate axes, comprising the steps of:
 (a) providing a plurality of pairs of accelerometers, each pair having their sensitive axes aligned in parallel with one of the rate axes and orthogonal to another rate axis with which that pair of accelerometers is associated;
 (b) periodically moving each pair of accelerometers in a direction orthogonal to both their sensitive axes and the rate axis with which the pair is associated, as a function of a periodic movement signal, the accelerometers of each pair each producing an output signal that is a function of the combined linear acceleration along their sensitive axes, and the rate of rotation about the rate axis with which the pair of accelerometers is associated;
 (c) for each pair of accelerometers, subtracting the output signal of one accelerometer of the pair to produce a difference signal for that pair;
 (d) for each pair of accelerometers, adding the output signal of one accelerometer to that of the other accelerometer to produce a sum signal for that pair;
 (e) determining an incremental change in velocity of the body along the sensitive axes of each pair of accelerometers as a function of the sum and difference signals for that pair, during a fractional portion of a complete period of the periodic movement signal;
 (f) determining an incremental change in angular position of the body about each rate axis as a function of the sum and difference signals for the pair of accelerometers associated with that rate axis;
 (g) determining an error component of each of the incremental changes in velocity that cross couples into the incremental changes in angular position for each rate axis;
 (h) determining an error component for the incremental changes in angular position of each rate axis due to cross-axis errors from the other rate axes;
 (i) correcting the incremental change in angular position for each rate axis for the error component of the incremental change of velocity;
 (j) correcting the incremental change in angular position for each rate axis for the error component due to cross-axis errors;
 (k) determining the angular rate of rotation and the linear acceleration of the body relative to each of the rate axes as a function of:
  (i) the corrected incremental change in angular position for that rate axis,
  (ii) the corrected incremental change in velocity for that rate axis, and
  (iii) the duration of the fractional portion of the period of the movement signal.

21. The method of claim 20, wherein the fractional portion of the movement signal comprises one fourth of the complete period.

22. The method of claim 20, wherein the angular rate of rotation and the linear acceleration of the body are determined at a measurement rate that is at least four times the frequency of the movement signal.

23. The method of claim 20, wherein the movement signal controls movement of each pair of accelerometers at a different frequency.

24. The method of claim 20, wherein the incremental change in velocity and angular position determined in a preceding fractional portion of the movement signal is used to estimate the error components of incremental changes in velocity and angular position of a subsequent fractional portion of the movement signal.

25. The method of claim 20, comprising the further steps of determining running averages of incremental changes in velocity and angular position for each pair of accelerometers during successive fractional portions of the movement signal, and determining the linear acceleration and angular rate of rotation for each rate axis as a function of these running averages, respectively.

* * * * *

UNITED STATES PATENT AND TRADEMARK OFFICE
CERTIFICATE OF CORRECTION

PATENT NO. : 4,896,268

DATED : January 23, 1990

INVENTOR(S) : D.C. MacGugan

Page 1 of 2

It is certified that error appears in the above-identified patent and that said Letters Patent is hereby corrected as shown below:

| Column | Line(s) | Error |
|---|---|---|
| Section [57] | Line 19 | "fo" should be --of-- |
| 4 | 36 | "$\Omega$" should be --$\underline{\Omega}$-- |
| 4 | 38 | "A." should be --$\underline{A.}$-- |
| 4 | 38 | "$\Omega$" should be --$\underline{\Omega}$-- |
| 4 | 38 | "A" should be --$\underline{A}$-- |
| 4 | 42 | "$\Omega$" should be --$\underline{\Omega}$-- |
| 4 | 44 | "A" should be --$\underline{A}$-- |
| 6 | 41-48 | "$(K_1 a + K_1 K_2 a^2)$" should be --$(K_1 \bar{a} + K_1 K_2 \bar{a}^2)$-- (both occurrences) |
| 6 | 57 | "a" should be --$\bar{a}$-- |
| 6 | 60 | "$a_{\frac{1}{2}}=$" should be --$\bar{a}_1 \underset{2}{=}$-- |
| 10 | 34 | "$\int x Q dt$" should be --$\int x \dot{Q} dt$-- |

UNITED STATES PATENT AND TRADEMARK OFFICE
CERTIFICATE OF CORRECTION

PATENT NO. : 4,896,268

DATED : January 23, 1990

INVENTOR(S) : D. C. MacGugan

It is certified that error appears in the above-identified patent and that said Letters Patent is hereby corrected as shown below:

| Column | Line(s) | Error |
|---|---|---|
| 13 | 11 | after "$2\rho^2\epsilon_1\phi\omega^2)\omega\cos\omega tp$" insert $-- + d2\rho^2\phi\omega^2(\epsilon_1 - \frac{1}{4}\epsilon_2\phi^2)\omega\cos 3\omega tp --$ |
| 13 | 12 | "$x\dot{Q} - \rho QR\sin\omega t - zQ^2 - \rho\dot{P}\sin\omega t$" should be $-- x\dot{Q} - \rho QR\sin\omega t - zQ^2 - \rho\dot{P}\sin\omega t --$ |
| 14 | 25-27 | "$x\dot{Q}T_p - zQ^2 T_p - \rho \frac{(QR + \dot{P})}{\omega}$" should be $-- x\dot{Q}T_p - z\tilde{Q}^2 T_p - \rho \frac{(\tilde{QR} + \dot{P})}{\omega} --$ |
| 15 | 41 | "Q" should be $--\dot{Q}--$ |
| 17 | 17 | "accleration" should be --acceleration-- |

Signed and Sealed this

Third Day of September, 1991

Attest:

*Attesting Officer*

HARRY F. MANBECK, JR.

*Commissioner of Patents and Trademarks*